D. BENSON.
STOCK FOUNTAIN.
APPLICATION FILED OCT. 3, 1916.
1,311,374.
Patented July 29, 1919.
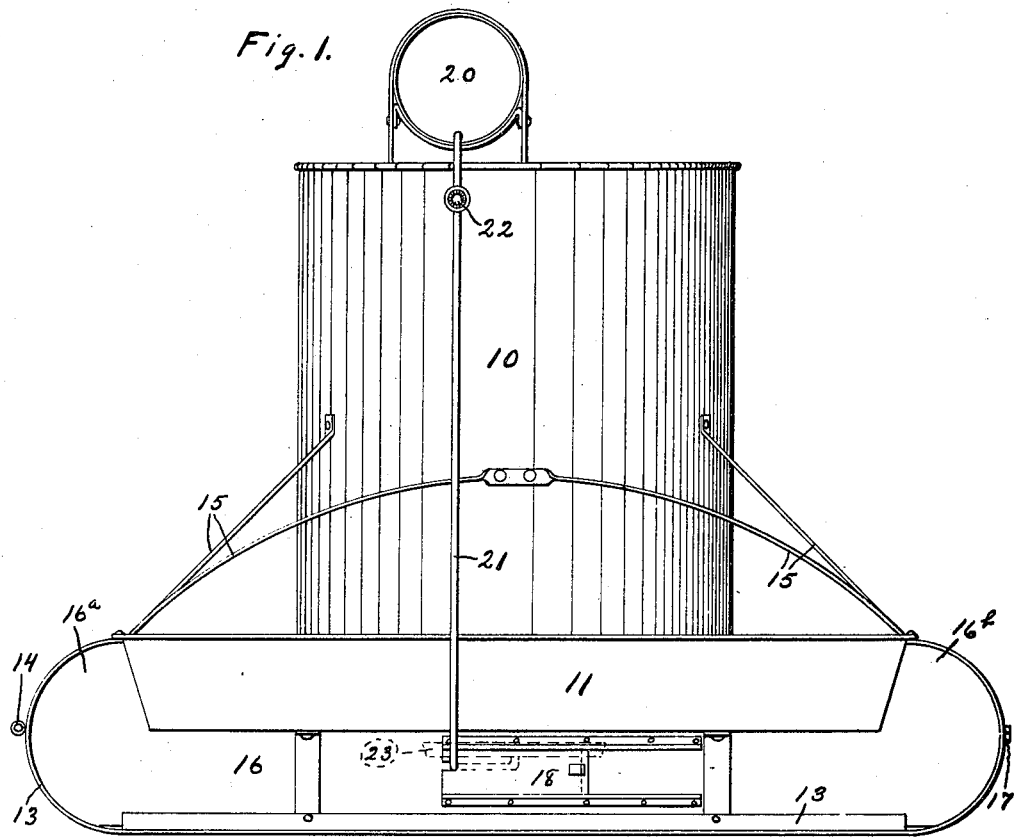
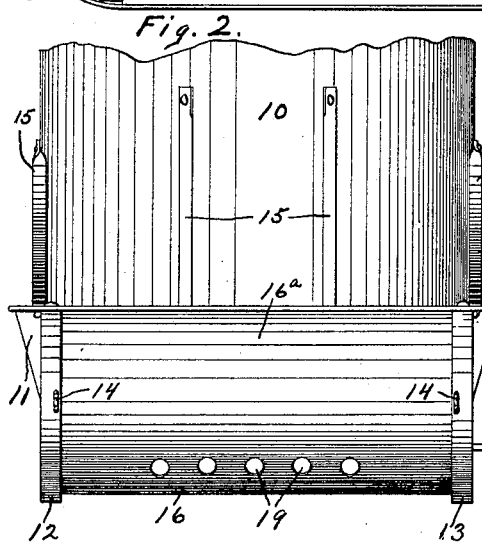
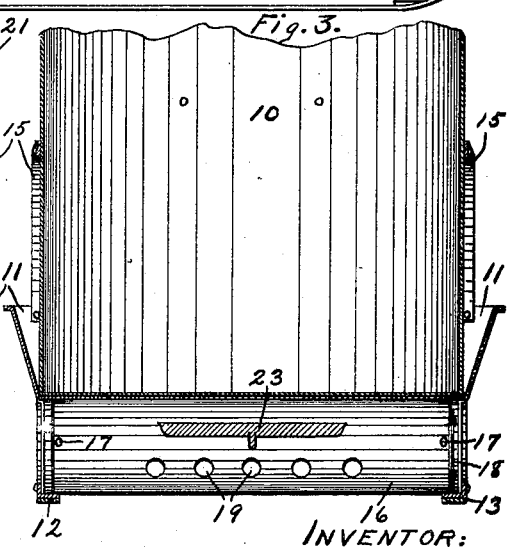
INVENTOR:
DAVID BENSON
By Earl M. Sinclair
Atty.

UNITED STATES PATENT OFFICE.

DAVID BENSON, OF LAMOILLE, ILLINOIS.

STOCK-FOUNTAIN.

1,311,374.     Specification of Letters Patent.     Patented July 29, 1919.

Application filed October 3, 1916. Serial No. 123,473.

*To all whom it may concern:*

Be it known that I, DAVID BENSON, citizen of the United States of America, and resident of Lamoille, Bureau county, Illinois, have invented a new and useful Stock-Fountain, of which the following is a specification.

The object of this invention is to provide an improved construction for stock fountains having means for heating the water tank and drinking pan.

A further object of this invention is to provide an improved form and construction for a heating pan.

A further object of this invention is to provide a removable and replaceable heating pan for a stock fountain.

My invention consists in the construction, arrangement and combination of elements hereinafter set forth, pointed out in my claims and illustrated by the accompanying drawing, in which—

Figure 1 is a side elevation of my improved stock fountain. Fig. 2 is an end elevation of the lower portion of the device, and Fig. 3 is a central transverse vertical section of the same.

In the construction of the device as shown the numeral 10 designates a water tank adapted to contain a supply of drinking water for stock, said tank being adapted to feed water automatically, in a common and well known manner, to a drinking pan 11, which extends at either end materially beyond said tank to provide drinking places for the stock. The means for supplying water to the tank 10, and for feeding it to the drinking pan 11 and maintaining it at the desired level therein, are not shown as they form no part of the present invention, but may be of any desired and suitable form. Runners 12, 13, preferably formed throughout the major portion of their length of angle iron, are mounted beneath and spaced from the bottom of the drinking pan 11, and said runners are curved outwardly and upwardly at their ends and secured to end portions of said pan. By means of the runners 12, 13 the drinking pan 11 is supported a short distance above the ground, and by means of said runners the device may be conveniently transported from place to place, eyebolts 14 being provided at one end of the runners for attachment of draft chains (not shown) or other draft means. Braces 15 are fixed at their ends to end portions of the drinking pan 11 and secured to the tank 10 on a plane above the top of said pan.

A heating pan 16, which is preferably long and flat throughout a major portion of its length, is removably mounted beneath the drinking pan 11 and is resting on and carried by the inturned horizontal flanges of the angle iron runners 12, 13. The heating pan 16 is of greater length than the drinking pan 11 and at its end portions conforms to the shape of the upturned portions of the runners 12, 13, being formed with upward projections $16^a$, $16^b$ extending upwardly beyond and inclosing the end portions of said drinking pan. The heating pan 16 is held in place by the eyebolts 14 and by other bolts 17 at the opposite end of the device, and said pan may be removed, during warm weather, if desired, by removal of said bolts and slipping the pan from between the runners 12, 13. The heating pan 16 is formed with a sliding door 18 in one side, by means of which access may be had to its interior. Air holes 19 are formed in end portions of the heating pan 16 to admit air thereto, for the purpose of feeding a burner as hereinafter set forth. Air also is supplied to the heating pan through the joints between said pan and the drinking pan 11.

A fuel oil tank 20, adapted to contain liquid fuel such as kerosene or gasolene, is mounted on the water tank 10, and may be elevated above the top of said tank if desired to feed the liquid fuel by gravity to the burner. A fuel pipe 21 leads from the tank 20 downwardly alongside the tank 10, and preferably is provided with a cutoff valve 22 at a convenient place, near the tank 20. The fuel pipe 21 leads to the interior of the heating pan 16 and communicates with a burner 23 of any desired form, adapted to burn the liquid fuel and provide heat for the interior of the pan 16.

In practical use the heating pan 16 is heated by the burning of fuel in the burner 23, and being entirely inclosed, except for the openings noted, conserves and holds the heat, radiating the same upwardly to the drinking pan 11 and bottom of the water tank 10, which, as it rests in the drinking pan, is immediately above said heating pan. The heating pan 16, by its upward projections $16^a$, $16^b$, also incloses and protects and heats the end portions of the drinking pan 11, which are the portions of the device in which water is most exposed to the elements. Thus water in the device is effectively protected from cold and freezing, and is kept at all times fit for drinking by the stock. In warm seasons the heating pan 16, together with the burner 23, may be removed if desired.

The cutoff valve 22 provides a convenient method for regulating and controlling the flow of liquid fuel to the burner, and is believed to be more desirable than a needle valve device for that purpose.

As the heating pan 16 is relatively low and flat, the drinking pan 11 is not unduly elevated above the supporting surface, thereby rendering the device accessible to animals such as swine without the provision of platforms, or setting the device into the ground.

I claim as my invention—

1. In a stock fountain having a drinking pan and runners carrying said pan in elevated position, the combination with said runners and pan of a heating pan removably and replaceably mounted on said runners and having its margins contiguous to said drinking pan and providing a substantially-inclosed space between said heating pan and the bottom and end portions of the drinking pan, there being a door provided in one wall of said heating pan for the passage of a heating device to said space beneath the drinking pan.

2. In a stock fountain having a drinking pan, runners carrying said pan in elevated position and a burner located contiguous to and beneath said pan, the combination with said runners, drinking pan and burner of a heating pan removably and replaceably mounted on said runners and having its margins contiguous to said drinking pan, said heating pan providing a substantially-inclosed space between it and the bottom and ends only of said drinking pan, there being ventilating means provided in said heating pan and there also being ventilating means provided between the margins of the heating pan and the drinking pan.

Signed by me at Davenport, Iowa, this 29th day of September, 1916.

DAVID BENSON.

Witnesses:
 LOUIS G. BEIN,
 H. STAAK.

Copies of this patent may be obtained for five cents each, by addressing the "Commissioner of Patents, Washington, D. C."